(12) United States Patent
Chirnomas

(10) Patent No.: US 8,494,672 B2
(45) Date of Patent: Jul. 23, 2013

(54) AUTOMATED STORE FOR SELLING ARTICLES

(76) Inventor: Munroe Chirnomas, Morris Township, NJ (US)

( * ) Notice: Subject to any disclaimer, the term of this patent is extended or adjusted under 35 U.S.C. 154(b) by 1006 days.

(21) Appl. No.: 12/299,472

(22) PCT Filed: May 2, 2007

(86) PCT No.: PCT/US2007/010757
§ 371 (c)(1),
(2), (4) Date: Nov. 3, 2008

(87) PCT Pub. No.: WO2007/130529
PCT Pub. Date: Nov. 15, 2007

(65) Prior Publication Data
US 2009/0149985 A1    Jun. 11, 2009

(51) Int. Cl.
*G06F 7/00*    (2006.01)
(52) U.S. Cl.
USPC .......................................................... 700/215
(58) Field of Classification Search
USPC .............................. 700/215, 214, 216; 705/26
See application file for complete search history.

(56) References Cited

U.S. PATENT DOCUMENTS

| | | | |
|---|---|---|---|
| 7,857,161 B2 * | 12/2010 | Pinney et al. | 221/10 |
| 2006/0025884 A1 * | 2/2006 | Henkel | 700/216 |
| 2007/0270999 A1 * | 11/2007 | Chirnomas | 700/221 |

* cited by examiner

*Primary Examiner* — Ramya Burgess
(74) *Attorney, Agent, or Firm* — Morton Chirnomas

(57) ABSTRACT

An automated (2) store for storing and then distributing articles. The store includes a housing (4) for receiving closed shipping containers for storage, and for distributing articles to an output (20) of the housing, which articles were retrieved from inside the shipping containers. The store further includes a sensing means (10) for determining the position of at least a portion of an outside surface of each one of the plurality of closed shipping containers that have entered into the housing, an automated forming means (12) for using the determined position specific to each of the closed shipping containers to form an opening in each of the plurality of the shipping containers, a storing means (14) for storing the plurality of opened shipping containers inside a storage area of the housing, a computer controlled retrieving means (16) for retrieving an article from inside one of the stored opened shipping containers and further including moving means (18) for moving the retrieved articles to an output of the housing.

13 Claims, 7 Drawing Sheets

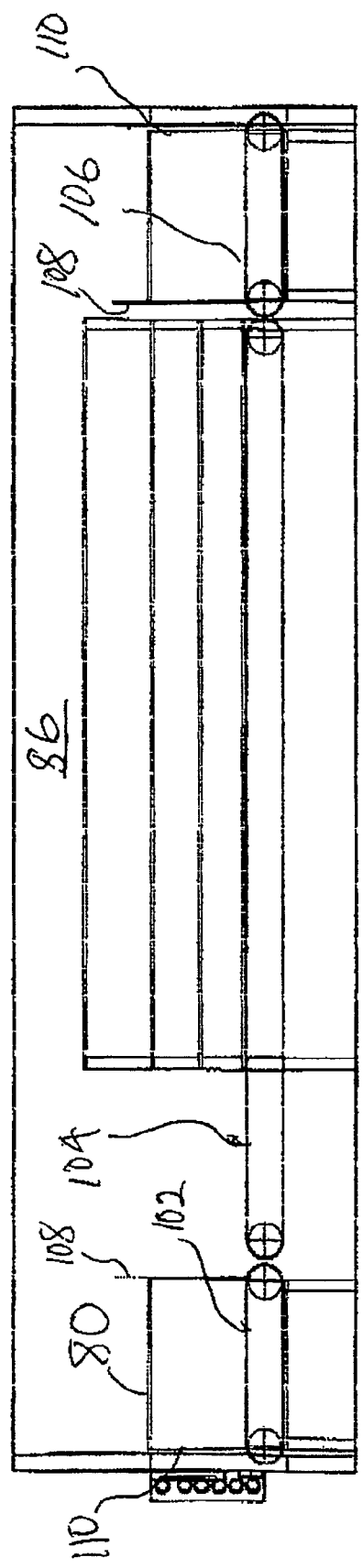

AUTOMATED STORE FOR SELLING ARTICLES

FIELD OF THE INVENTION

The present invention relates generally to an automated store for selling articles, and more particularly in one embodiment, to a system for automatically receiving, opening and storing shipping containers and retrieving articles from the shipping containers.

BRIEF DESCRIPTION OF THE DRAWINGS

FIG. 10 shows one embodiment of a conveyor system for use in the housing of FIG. 1, having a first conveyor 102 for transporting the authorized containers into the interior of the housing, a second conveyor 104 for transporting the containers to the opening means, as well as to the storage means 86, and a third conveyor 106 for transporting the selected articles and containers through the interlock area 68 to an output port leading to the exterior of the housing. Note internal and external doors 108 and 110, respectively, for the interlock areas.

DESCRIPTION OF THE INVENTION

Figure 1:
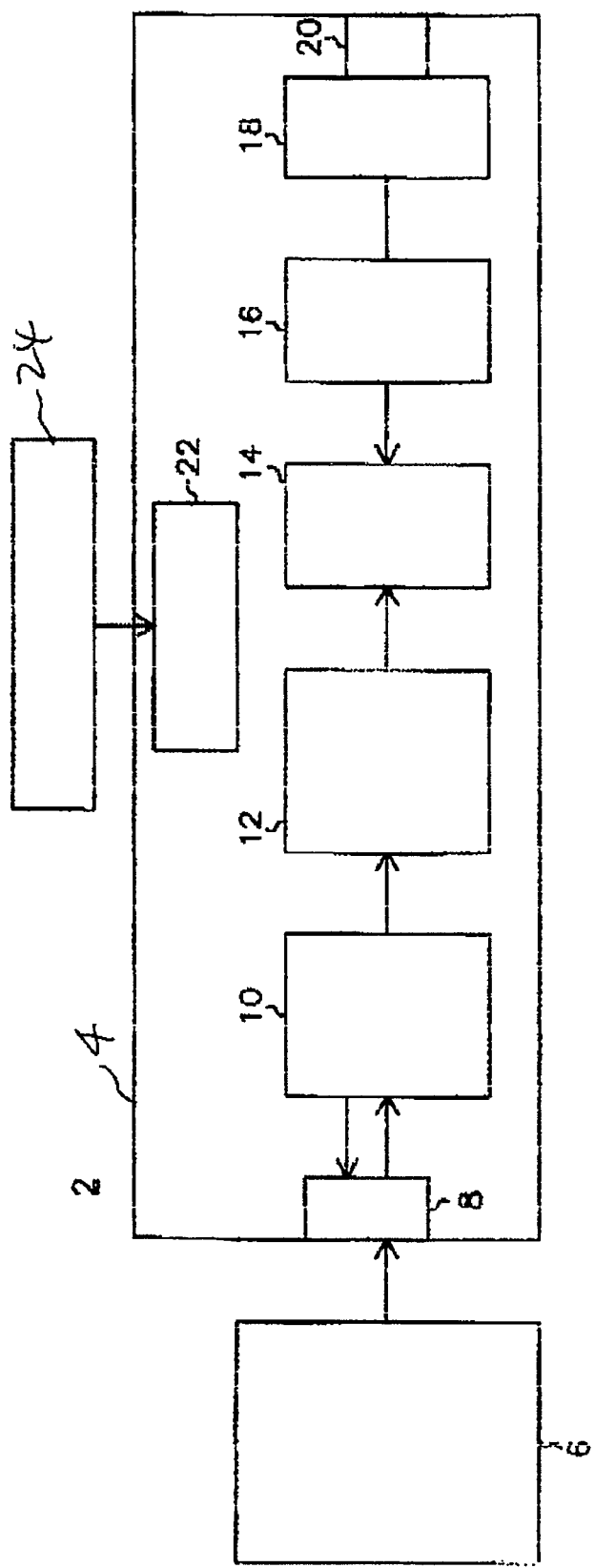
FIG. 1 illustrates one embodiment of an automated store in accordance with the invention.
Figure 2:
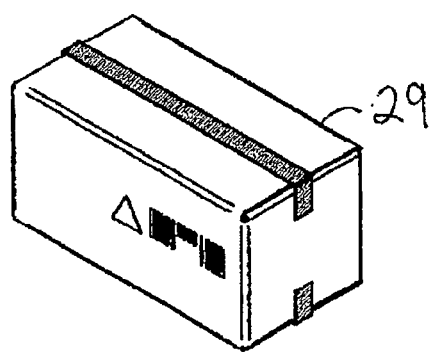
FIG. 2 illustrates a typical shipping container of the type to be received and stored in the store of FIG. 1.
Figure 3:
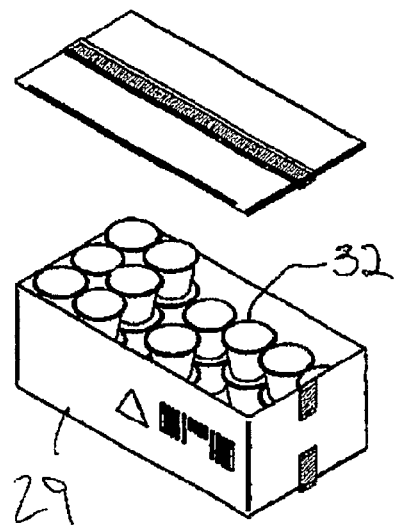
FIGS. 3-5 illustrate various openings formed in various shipping containers.
Figure 4:
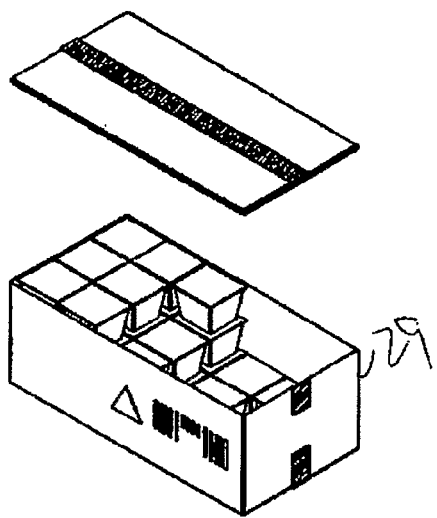
Figure 5:
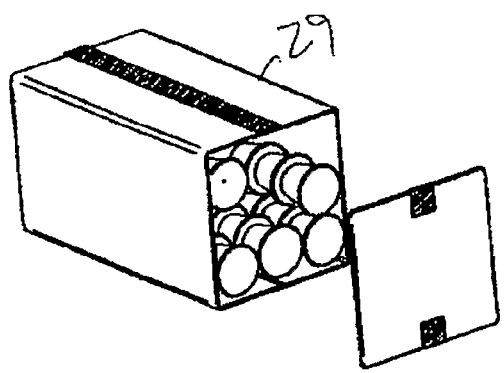

FIG. 1 shows one embodiment of a system which is an automated store 2 for storing and selling articles. The automated store having a housing 4 for receiving closed shipping containers (29 of FIG. 2) into the housing for storage, and for distributing articles 32 of FIG. 3, to an output 20 of the housing which articles 32 were retrieved from inside stored shipping container 29.

In one embodiment, a store including an entry means 8, 80 for controlling entry into the housing 4 of a plurality of closed shipping containers 29, with at least some of the plurality of closed shipping containers having outer dimensions which are different from the outer dimensions of other ones of the plurality of closed shipping containers.

The embodiment shown in FIG. 1 also shows a sensing means 10 for determining the position of at least a portion of an outside surface of each one of the plurality of closed shipping containers that have entered into the housing.

Figure 8:
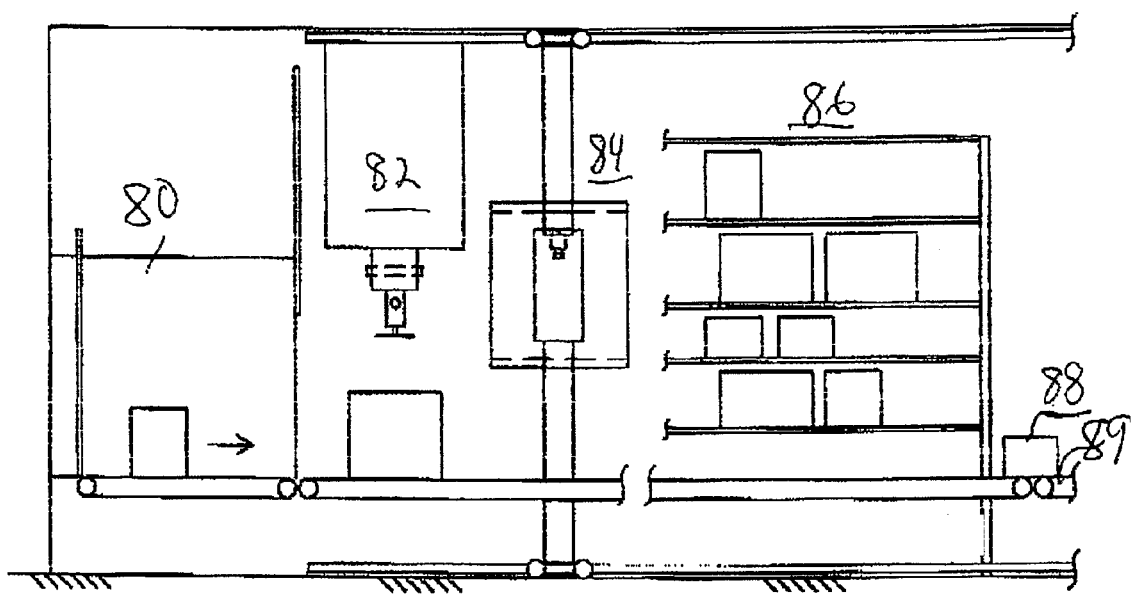
FIG. 8 illustrates a view of the interior of the housing at the input end, where the shipping containers pass through a secure portal/interlock area 80, have an opening formed in the containers by a robotic box opening mechanism 82, are conveyed to a storage area 86, and finally showing a user container 88 which contains articles which were ordered by a user, being moved by a further conveyor 89 toward an output of the housing 4.

The embodiment of FIG. 1 shows an automated forming means 12 (and 82 of FIG. 8) for using the determined position specific to each of the closed shipping containers to form an opening in each of the plurality of the shipping containers The embodiment of FIG. 1 shows a storing means 14 (and 86 of FIG. 8) for storing the plurality of opened shipping containers inside a storage area of the housing.

Figure 9:
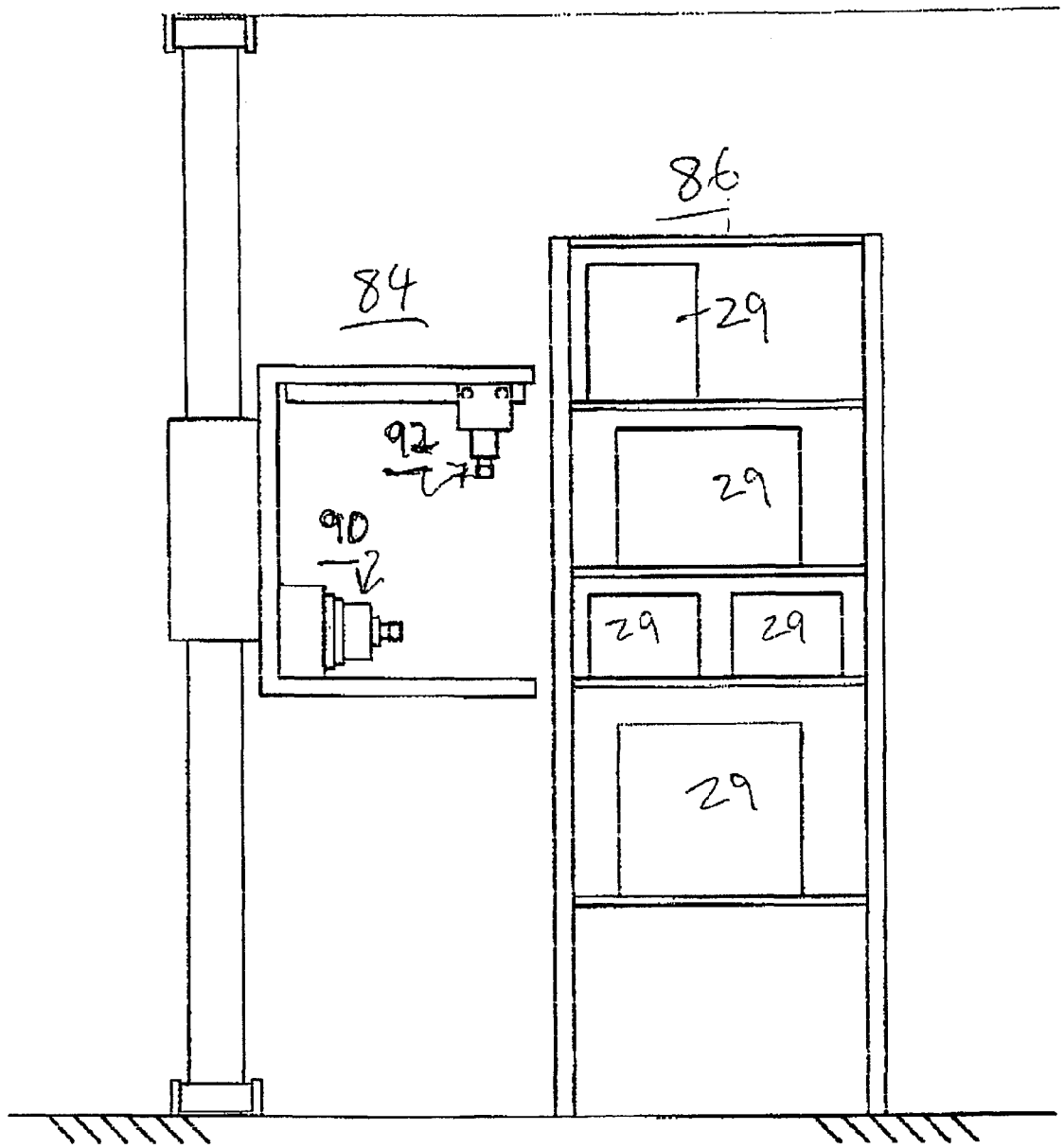
FIG. 9 illustrates one embodiment of an article retrieval device 84 for the invention, which uses a first robotic device 90 for positioning the opened containers 29 into and out of the storage area 86, and a second robotic device 92 for retrieving articles from inside the opened containers by using the openings as shown in FIGS. 3, 4 and 5.

The embodiment of FIG. 1 furthermore shows a computer controlled retrieving means 16 (and 84 of FIG. 8 and 90, 92 of FIG. 9) for entering into selected ones of the opened shipping containers located in the storage area, by passing through the formed opening so as to retrieve an article from inside one of the stored opened shipping containers; and The embodiment of FIG. 1 furthermore shows moving means 18 (and 88 of FIG. 8 and 106 of FIG. 10) for moving the retrieved articles to an output 20 of the housing. Element 6 represents the delivery of the shipping containers to the housing 4, element 22 illustrates the controller for the elements within housing 4 and element 24 is a user/customer interface for making selections and payments for obtaining articles from the store.

Figure 6:
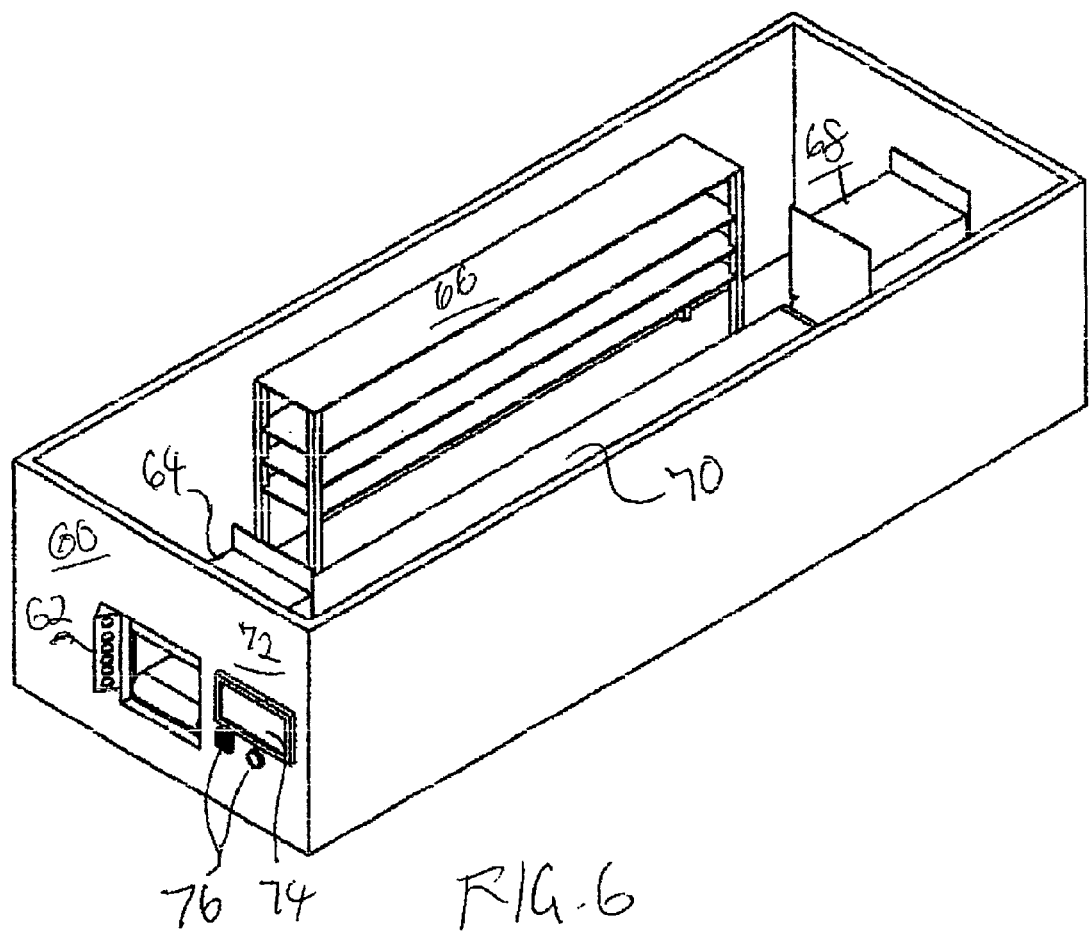
FIG. 6 illustrates one embodiment of the store of FIG. 1, having an input port, including a shipping container sensor/scanner/ID device 62, an interlock area 64, a container storage area 66, an output area 68 and a container conveyor system 70 located between input 64 and output 68. A customer interface 72 is also shown, including a touch screen 74 and article selection and payment interface devices 76
Figure 7:
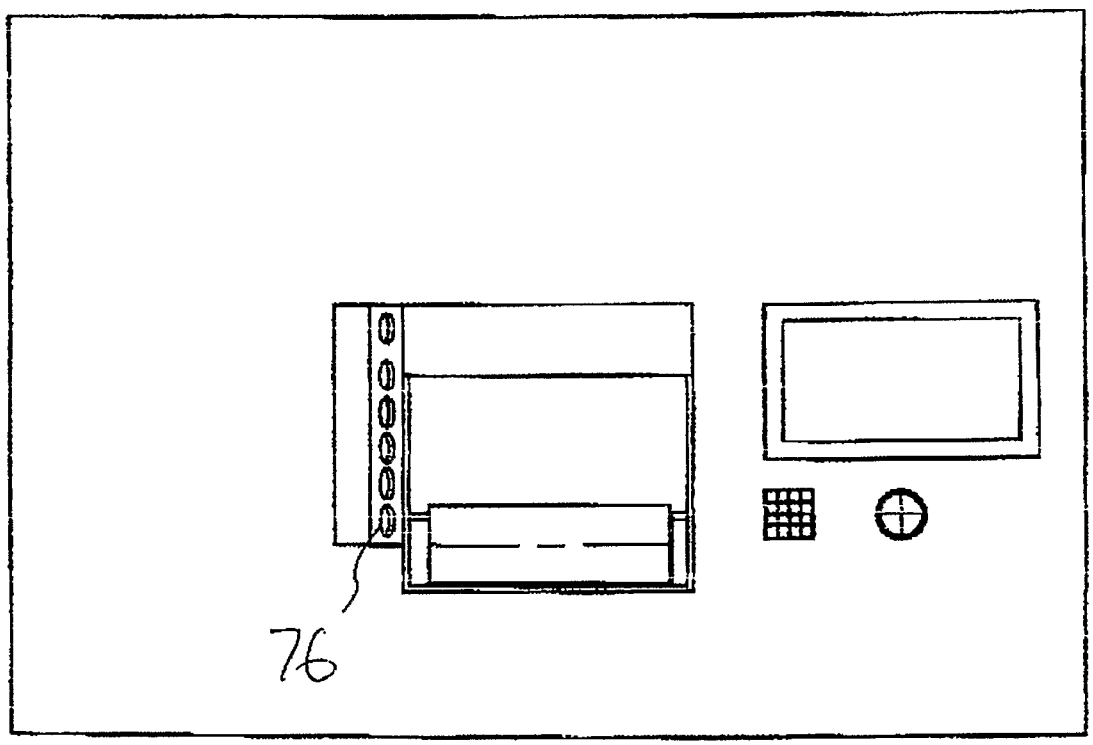
FIG. 7 illustrates a more detailed view of the input port and customer interface of the store of FIG. 6.

FIGS. 6 and 7 show further details of the automated store described in FIG. 1, further including a customer interface 72 which allows a customer of said automated store to select a desired one or more of the articles stored therein. The customer interface can also allow a customer of said automated store to make a payment for the one or more of the selected desired articles. An Internet connected communication device for allowing the customer to access said automated store via the Internet, a touch-screen 74 or other selection and/or payment device 76 located at the site of the automated store can also be included in the system. The housing described herein can also include means for providing a secure environment for the shipping containers and the other recited means herein which operate the automated store. The entry means can include authorizing means for authorizing the entry into the automated store of only authorized shipping containers. Furthermore, the authorizing means can include means for authorizing a delivery person, which delivery person, once authorized, is deemed to supply authorized shipping containers to said entry means. The authorizing means can include the means to communicate with a database in order to confirm that specific shipping containers were anticipated and pre-authorized for entry into the housing. The authorizing means can be enabled to communicate in real time to a remote location and/or to a remotely located person and/or compute. The authorizing means includes a shipping container identification (ID) device for determining the identity of a shipping container. The shipping container ID device can access a database in order to determine one or more of what articles are contained in the shipping container and how those articles are arranged n the shipping container, based on its determined identity.

The shipping container ID device can further cooperate with a manipulation device for manipulating the shipping container in order to enhance the ability of the shipping container ID device to determine the identity of the shipping container. The manipulation device can include one or more of, a gripper mechanism, a robot, a device that can rotate the shipping container. The shipping container ID device can include a camera imaging system. The camera imaging system can use image or pattern recognition techniques to identify the shipping container and also can recognize and identify the articles located inside the opened shipping container. The camera imaging system can include a color image sensor for sensing attributes of the shipping containers, which attributes are then and compared with information that is stored on a database, either a local or remote location, so as to identify the shipping container. The camera system or other sensor type system can be utilized by the computer control system to enable the guiding of the manipulation device or the article retrieval device. This database can contain information which is specific to a given shipping container and or a specific article or package which information can be utilized by the system in conjunction with information generated by the sensors or camera system in order to facilitate the guidance of the retrieval apparatus and or the manipulation apparatus. This same database can also be utilized and/or integrated with the database which is used in determining the whether a container or package is authorized to be in the store. The shipping container ID device using one or more of a Barcode Recognition system, an RFID system, a Text reading system, an optical scanner.

The housing can be one of a fixed structure, such as a stand-alone housing, a building, or a portable structure, such as a trailer. The housing can also be adapted to be located at a position that is one of above ground or underground. The housing includes a secure input system which permits only authorized entry OF CONTAINERS OR PEOPLE to places within the housing. The secure input system includes an interlock area having an exterior door for preventing entry into the interlock area. The opening of said exterior door is can be enabled TO OPEN when the authorizing means has authorized the entry into the automated store. The authorized opening of the exterior door can also be enabled by utilizing a physical lock and key or other similar type of device. The interlock area can be adapted to receive, and then automatically pass therethrough, without human interventions, only authorized shipping containers. The interlock area can be an area bounded by the exterior door and an internal door, where passage of authorized containers past the internal door can only occur after said exterior door has been closed and a sensor has determined that only authorized persons or shipping containers are in the interlock area.

The system can include a conveyance system for moving Shipping containers that enter into the housing to places further within the housing.

The forming means can operate so as to form said opening in said shipping container at a location and with a dimension that is specific to the identified typed of each of the plurality of shipping containers, so as to thereby ensure that said computer controlled retrieving means can enter the opened shipping container by passing through the formed opening. The system can determine where to create an opening location into the box based on information on specific parameters of the box, including for example based on the physical layout of the insides, The forming means forms said opening by removing from the shipping container a side thereof, removing a portion of the outside surface of said shipping container, by removing tape which is sealing the opening and thereby unsealing and lifting up flaps of said container, and then alternatively on other embodiments physically separating said flaps from said container or securing said flaps to exterior side of said container, for example using tape to tape the flaps to the sides of the box in the opened position in a manner so as to form said opening in said container. The system can further include a disposing device for disposing of material removed from said shipping containers to make said opening.

The automated store can have storing means also to store therein received shipping containers which have not been opened, so that said not opened shipping containers can be delivered to the output of the housing. The system can also deliver to a user a combination of articles which were retrieved from opened shipping containers as well as delivering unopened shipping containers to the user.

The store has storing means for storing containers which can include a plurality of storage areas for receiving for storage therein said shipping container. The storage areas can include an arrangement of one or more bins or racks. The storage means can store the opened or closed shipping containers in a position which is best suited for the article retrieving device to retrieve articles from the container. This may include storing the shipping container with the opening facing upward or towards the retrieval mechanism or in another direction which is suitable to the successful retrieval of the articles inside the shipping containers. This can include racks that are situated to present the containers to the retrieval apparatus, or at an angle, or with the opening facing upward, or with opening frontward with facing towards the retrieval apparatus, or stored in a position which keeps track of the location of the inside layout or positions of the articles based on the database information relating to that specific type of container type and/or article type stored in that container type. The shipping container can be stored in a specific position and with a specific orientation so that, for example, not only is the opening facing a certain direction in the storage location but container may be also positioned so that specific sides of the container may be facing in a certain direction, so that the system can determine where to place the retrieval apparatus in order to be able to grip to one of the packages.

The system can further include a shipping container positioning system for moving said opened shipping containers into said storage areas.

The article retrieving device can include a robotic article grasping device, which uses a vision system, and/or pattern recognition to guide the retrieval apparatus for retrieving said articles from said shipping containers. The article retrieving device may include a robotic article grasping device, which uses vacuum sensing for determining when said article retrieving device has grasped an article. The article retrieving device can include one or more of a robotic device, gantries, and grippers of different sizes and shapes, and methods, for example, the grippers can be of the type with use one of more of suction cups or electromechanical gripping devices.

In one embodiment of the invention, an enclosed and secure structure or housing which can limit people from gaining access into the housing, and more particularly from gaining access to any of the articles or containers located inside the housing, includes a loading port for receiving a plurality of closed shipping containers, the plurality of shipping containers can include a variety of differently shaped or differently dimensioned shipping containers which contain articles therein and/or articles to be transported into the housing, a security authorization means for ensuring that only authorized shipping containers are allowed to either enter into the housing or additionally or alternatively to be stored in the system, a shipping container detection means that enables the system to detect the position and/or location of at least a portion of the outside surface of the shipping containers which have been loaded into the housing, an opening means for forming an opening in the shipping containers, a conveyance means for conveying the opened shipping containers to storage locations for storing at least some of the shipping containers, a retrieval means for retrieving articles, and/or packages containing articles, from inside the shipping containers, a conveyance means for allowing containers and/or articles to be transported from within shipping containers located inside the housing to a user of the system who is outside of the housing and the user of the system can access and remove the articles being distributed from the system. In addition, the system can have a user interface such as a touch-screen video system, typically located outside of the secure housing, in order for the user to communicate with the system and for inputting data such as order selections into the system. Additionally, the system can utilize computer controlled sensors and other technology including electromechanical sensors, pattern and or image recognition hardware and/or software in order to identify a specific shipping container, a specific article or package type, and or the location and orientation of a specific shipping container or the location and orientation of a specific article or package which is located inside a shipping container The system has a computer control means for controlling some or all of the various apparatus within the system including some or all of the apparatus described herein.

In other embodiments, the system can also include the ability to retrieve one of a plurality of articles from inside various shipping containers which are stored inside the housing and move the plurality of articles into a single user container which is supplied from within the housing and can include containers such as a paper bag, a plastic bag or a cardboard box.

It is noted that it is not required that the loading port or user access port be structures that are separate from the housing, and in some embodiments of the invention, the loading and user access port s can utilize the same or different structures as the housing. It is also noted that the loading or user access port can be formed using a separate structure which is connected to the housing. The port may include conveyance apparatus which can include conveyor belts, elevator systems, pneumatic tube structures that are connected to or part of the housing. Additionally, in another embodiment, the port can be a secure door through which containers or packages are placed or retrieved manually.

Article Handling

In accordance with the invention, the housing includes apparatus for providing automatic handling of articles to be located therein.

One type of such automatic handling apparatus includes a conveyance apparatus for transporting a plurality of containers into the housing via the loading port and a conveyance apparatus for transporting the containers (or articles that were located inside the container), via the user access port, to a user of the housing who is located outside of the housing. These conveyance apparatuses can be totally separate from one another, or can comprise a combined or even the same apparatus. It is noted that IN SOME INSTANCES, THE TERM SHIPPING CONTAINER COULD mean VARIOUS typeS of containing deviceS or packaging, such as a boxES, cartonS, bagS, tubeS, etc. Such containers can have one article or item stored or contained within them and/or can have a plurality of items stored within them. In most embodiments, the shipping containers being received by and or loaded into the system are of a wide variety in size and or shape and or material thicknesses and may be made of various types of materials such as cardboard corrugated material or for example paperboard or other types of packaging materials.

In accordance with an aspect of the invention, the ASDS includes a container identification (ID) system which can identify a container being presented to the housing and which can then enable a control system of the ASDS to determine whether the container is authorized to be conveyed into the housing or into the storage area within the housing. This determination by the control system can be based on many factors, such as whether the control system was anticipating that specific type of container or even the specific unique package at that time. Additionally, the determination to allow the container into the housing can be based on whether the control system determines that there is sufficient space in the housing to store the container. The ID system can include a bar code scanner, an RFID device, a camera, an optical sensor, mechanical sensors or other sensors.

The housing may also include an apparatus for automatically creating an opening in a portion of a container which may include the removal of a portion of a container in a manner so as to not damage the articles located therein, the opening created in the container being of sufficient dimension and location in the container so that articles located in the container may be removed from the container. Alternatively, the container may never be opened by the opening apparatus, and transported to the second storage location in an intact and unopened state.

It is noted that various types of known systems can be used for manipulating the container, and/or the cutting instruments for creating the opening in the container, such as rotating and/or stationary blades, laser beam cutters, etc. Such cutting devices are know in the industry, see for example U.S. Pat. No. 6,863,486.

A conveyance apparatus is used for bringing the container to a storage location in the housing, which storage location can include a shelf, rack or bin The conveyance apparatus may include a traditional type of conveyor belt or chain driven transport system (powered by a device such as a motor, a hydraulic or pneumatic system, a screw feed, a rack and pinion, or a piston mechanism or some other mechanical device), and may or may not be used in conjunction with further article handling mechanisms, such as a gantry robot, a multi axis articulated arm robot, or some other mechanically based article handling system.

This conveyance to the storage location can be done before or after any opening is made in the container.

In the event the container is to be opened, once the opening in a container is provided, an article retrieving device located in the housing can access the opening for removing the articles from inside the container, thereby enabling the articles to be transported to a second location. Such transportation of the article to the second location can be done by the article retrieving device, or can be done in combination with a further conveyance apparatus.

In one embodiment the removal of an article from a container can be accomplished using a gripper. The gripper can include a vacuum based suction cup or mechanical claw type gripper or other material handling mechanism, all of which are commonly know in the art. In order to facilitate the proper retrieval of items from the container, a robotic device utilizing optical, vision, vacuum or other sensors can be used.

It is noted that in a preferred embodiment, a disposal apparatus is provided for securing to the material, if any, which may have been removed from the container to form the opening, so as to transport any such material to a disposal or recycling area. Such securing apparatus can include a mechanical or suction-type gripper, a robotic arm, or some other material handling device. A portion of the apparatus that removes a portion of the container and creates or forms the opening, can also form part of the apparatus used to remove and dispose of that material removed to form the opening.

It is also noted that the housing could have multiple storage locations therein so as to accommodate a plurality of containers of similar or different shape and/or size. Each container may have similar or different items or articles inside them. A container could have only one item contained inside, while another container could have a plurality of items or articles contained inside.

It is noted that the article retrieving device which removed the article from the container, could be all or part of the conveyance apparatus that puts the article in the second storage location. Alternatively, e the article can be moved with a separate conveying apparatus to the second location.

In accordance with another aspect of the invention, the second location can be or have co-located therewith, a further container, such as a non-returnable bag or box, that is delivered to an end user. Such further container is hereinafter called a delivery container. In one embodiment, the delivery container can move with the article retrieving device so as to be positioned to directly receive one or a plurality of articles from the article retrieving device, which articles were removed from one or a plurality of containers. Once the article is in the delivery container, the system can dispense that container with one or a plurality of items requested by the user, to be conveyed out of the user access port of the housing and to the end user end user (or a package delivery service). Alternatively, the delivery container can be held for an indeterminate period of time in order to receive additional items and/or to be held for a few hours, days, or more for later pick-up by end user (or a package delivery service). Thus, the delivery container receives the items requested by the end user. In the event that the items requested are unopened containers, then it is possible that no delivery container would be used. How about add description of a "palletizer for making larger containers for passing out to the user/customer . . . .?

The delivery container may be of the type which is preformed before being located in the housing, or it may be of the type which is formed within the housing, such forming can be accomplished using any one of known carton or bag forming devices, and the carton or bag can be formed so as to have handles to assist the user or a delivery service for the transportation and/or movement of the container to the end user.

In another embodiment of the invention, there is no delivery container, and the stored articles are delivered directly and individually to the user waiting at the user access port, via the conveyance apparatus without the use of a bag or carton.

In a preferred embodiment of this aspect of the invention, the system can seal the delivery container, using for example an adhesive tape. Additionally, automatic means can be provided so as to be print or otherwise affix to the container addressee/user information so that the delivery container is ready to be received by a package delivery service for delivery to the end user.

It is noted that the housing of the ASDS can comprise various sections, each section having, for example, a different environmental condition, such as a different temperature or humidity. Such conditions can be attained by the use of airconditioning or other refrigeration system located in, on, or near the housing, thereby enabling at least a portion of the inside of the housing to be kept air conditioned, refrigerated, frozen and/or in an ambient environmental condition.

In accordance with a further aspect of the invention, a payment mechanism is associated or otherwise included with the automated storage and distribution system, thereby configuring it as an Automated Selling Device. For example, when the system and structure comprises a retail store for the storage and sale of goods, there are several ways a user of the store can access the payment system, such as by:
i) using an internet/online based access,
ii) using an order entry interface device which is located outside the housing, but in proximity thereto, such as a touch screen, bar code scanner and menu/list system, or other input device, to enable users to request one or more of the articles in the store, or
iii) using a user supplied device when the user is in close proximity to the store, such as a PDA or a cell phone.

Additionally, a variety of end user payment systems may be used in conjunction with the automated selling device for enabling the end user to pay for the articles delivered to him. The end user payment can be made by cash, debit, credit or other electronic method, and can be made at the site of the storage system or can be processed via a remote link which can include use of the internet or a cell phone.

The automated selling device can also be accessed using a security code or other method which methods can include the use of a magnetic card, a biometric device, a PIN number code or other similar system. This will enable a deliver service to deliver or remove articles or packages from the enclosure in a secure manner.

Thus, the system can also be used as a sales system thereby distributing goods in exchange for payment, or alternatively, it can be used as a secure distribution system which prevents access of stored items from being retrieved unless a person has authorization to do so, such as a delivery service which is retrieving a parcel from the enclosure for further transportation.

In an even further alternative embodiment, the system can be used as both an automated warehouse for controlling the access of the goods inside for security purposes, and additionally can also allow items to be sold from the system as the need may arise.

Therefore, it is possible that the very same system can function at any given time as either a secure distribution warehouse and or a retail or wholesale outlet. So for example, a parcel delivery company can use the system as a distribution depot for the transfer of goods from one distribution site to another one or to a final customer where, payments are not necessary for accessing the goods or containers inside. In another scenario, the very same system can be selling items from the housing to other persons who are interested in purchasing goods from the system.

Additionally, the system can be utilized as a public warehousing or distribution system enabling people to have items stored in the housing and whereby they can retrieve the items or packages at a time of their own choosing.

The above noted devices can be accessed by the user via a drive-up or walk up window.

For enhanced services from the store, a user can access a remote site via a remote video and/or audio link to a live person, if the end user at the store needed assistance.

In accordance with a further aspect of a further preferred embodiment of the invention, the automated storage and distribution system includes an imaging system. The imaging system can be used to identify the orientation of the containers in the housing using sensing mechanisms, such as mechanical sensors, a vision or image or other optical device, as well as a bar code device or radio frequency ID tag device (RFID).

Such imaging system may cooperate with the robotic or conveyor apparatus, in order to assist with re-orientation of the container in a manner so as to prepare it for storage, or for assisting with the forenoted manipulation so as to ensure the container is properly placed before forming the opening therein.

The forenoted article retrieval device uses the image system, and additional sensors (such as suction sensor or further image or proximity sensor) to identify where and how to grab or otherwise secure to the articles to be removed from the container. It is also noted that the article retrieval device may, if desired, grab more than one articles when removing them from the container.

Information relating to metrics of the container dimensions, container contents, opening orientation and instruction set, internal layout of articles within the container or carton, color or shape of the articles or packages inside the container or carton, whether the items contained inside are of a delicate or rugged nature, can all be accessed by the system from a database which can be stored at the site of the housing or can be remotely updated to the system via a remote link, including using the internet, a wireless system or a wired communication connection. END OF It is noted that in accordance with a further aspect of a preferred embodiment of the invention, a shipping container which is stored in the housing, once opened, may be used as a storage container for the articles, that is, the shipping container is moved to a storage location with all the articles still positioned inside the container, and then the article retrieval device selectively removes articles from one or more of the stored containers, in order to fill a request for articles from an end user (i.e., customer). In this way, there is no need to have a person manually load the items discretely into a storage area within the housing, since the container in which the items were transported to the distribution system housing, also acts as the storage device from which the individual items may be automatically retrieved by the retrieval device.

A particular advantage of the present arrangement is that it provides an automatic, i.e., non-human contact, process which allows an end user to obtain individual ones of articles that are shipped in bulk in a sealed container from a manufacturer. That is, the shipping containers received into the housing could have been "sealed" at the factory or warehouse of the manufacturer of the articles, and an end user can obtain one or more of the articles from inside one or more of the various containers stored inside the housing, in a manner that does not involve human contact to the articles.

As noted above, in another embodiment, the system can distribute and or convey unopened containers as well as items from opened containers to the user access port. This may be desirable since some containers may only have one item inside, or a given user may wish to retrieve or purchase a full carton of a specific item.

In an even further aspect of a preferred embodiment of the invention, once all the articles have been removed from the shipping container, the disposal apparatus attends to disposal of the container. In one embodiment, the apparatus may convey the empty container to a disposal location with one or more compacting devices that may be located in or attached to the housing.

In an even further aspect of a preferred embodiment of the invention, metrics regarding the container are, in advance, and either remotely or directly, input to a computer controller of the automatic storage and distribution system, which metrics provide information to the vision and/or opening devices. Once the container and its contents have been identified, specific to attributes of various ones of the containers and the articles positioned therein can be used to determine and or control further handling and transportation of the container and its contents into and around the inside of the system.

Additional feature of a preferred embodiment can include remote video monitoring of the system which can monitor any part of the process within the housing so that if there is a malfunction, a computer or a person at a remote location can assess the situation and can even remotely take control of the system in order to rectify a given problem.

Additionally, a person loading containers to the port or the housing can be required to input an authorization code through one of various electronic means, including a magnetic card, a PIN number, a fingerprint reader or other method which would enable that person to activate a secure port thereby enabling him to load a container into the housing. Both the loading port and the user access port can be designed to be secure, thereby not allowing any person access into the housing area or the storage area. So, while a person may be authorized to deliver packages or cartons to the housing, that same delivery person has no access to the inside of the housing and he cannot access any containers or packages which are located inside the housing. In this way, the person delivering the containers does not have to be a person who the owner of the distribution system has any prior dealing and there is no need to have any relationship of trust or otherwise in order for the delivery person to facilitate the loading of containers or packages into the housing of the distribution system.

A particular advantage of the above system and its various embodiments, as compared with prior art storage and distribution systems, or retail stores, is that a significant cost of such prior art systems is due to the labor involved in moving cartons (with or without further articles positioned therein) from the manufacturer to an intermediate storage/distribution facility and then to the location where the user will pick-up the articles (i.e., such as onto the shelf of the retail store). Such shipping, storage and handling costs experienced by the article manufacturer and the store owner/operator are ultimately passed on to the end customer, as reflected in a higher final sale price of the article. On the other hand, the system of the invention allows the storage and distribution system (i.e., a retail store or a warehouse distribution system built according to the present invention) to leverage existing article transportation infrastructure and services, such as the United Parcel Service (UPS) and Federal Express (Fex Ex) or other general trucking and transportation companies, to deliver the containers to the housing of the inventive system. These existing transportation service company's typically provide for article transportation to literally any place on the globe at a highly efficient and competitive price. Thus, by using such service company's for container transportation and loading of a structure in accordance with the present invention, this feature results in a significant savings over an article manufacturer having to distribute his products on his own, thereby requiring a fleet of trucks, drivers and a plurality of centrally located distribution centers as well as all of trustworthy personnel required to stock the shelves and or pick the products.

The system of the invention also includes automated systems inside the housing which attend to the initial sorting, final storing and then ultimate distribution of the articles to the end user, all without additional costs for employee labor or providing the physical and financial infrastructures needed for employees. Thus, many of the "manpower" and "real estate" costs involved in the operation of a retail store or a distribution warehouse are avoided. Such costs include: the requirement to provide an environment "habitable" to employees, such as sufficient area for them to work and sufficient light, air, heat etc., a place for them to take care of personal needs, such as a bathroom, the provision of vacation time, time off, administrative and management employees to oversee lower level employees, etc. All these costs are avoided, as well as all of the other overhead and indirect costs of employees. Without employees, the size of the store can be limited to not much more than is need to actually store and distribute the articles to be dispensed, and the real estate required to meet such habitability needs of employees is avoided.

A further advantage relating to the fact that the above handling of the cartons and articles inside the housing is accomplished in a mechanized and automated way, without human intervention, is that:
- the loading of the housing with the cartons can be accomplished by an unskilled person, such as the truck driver/carton delivery person,
- employee and third-party delivery person related issues, such as article and monetary theft, as well as article damage due to mishandling, is avoided.

These advantages result in real cost savings for the automated store owner/operator, and allow for greater profit margins without increasing the cost of the articles being dispensed as compared with traditional stores.

While the present invention has been disclosed with reference to certain embodiments, numerous modifications, alterations and changes to the described embodiments are possible without departing from the sphere and scope of the present invention, as defined above. Accordingly, it is intended that the present invention not be limited to the described embodiments, but that it has the full scope defined by the above language, as well as equivalents thereof.

In accordance with the above description, the present invention includes, among other features:
1. an enclosure
2. a port which enables transfer of packages into the enclosure, this port can include a means for controllably blocking access into the housing,
3. a port which enables transfer of packages out of the enclosure, this port can also include a means for controllably blocking access into the housing, and,
4. means for removing of a portion of packages in the enclosure so as to make an opening, so articles stored therein can be automatically, and without human contact or intervention, removed from the package.

In accordance with further aspects of the invention:
- at least one package which has been transferred into the housing though the port includes a plurality of "articles" therein.
- the articles can include a further package that contains more articles.
- the package opening device includes a cutting device, for cutting the package to make the opening.
- Further including an article retrieving device located in the enclosure for removing articles from a package using the opening, and transferring the articles to a further location.
- providing to the user goods that are retrieved from a location in the enclosure upon the users request.
- where the further articles were received into the enclosure in one or more packages which were sealed by the supplier of the articles, and the articles were delivered to the end user at the retrieval of the housing by fully automatic means in the housing, so that the articles are removed from the sealed packages and then delivered to the user all without human contact.

Furthermore:
1. the further location may be a predetermined storage location in the enclosure, or
2. the further location may be the user access port.
3. Where the further location may be a "dispensing container" which is provided to the user via the user access port
4. Transfer means are located inside the housing to transfer at least one of the packages from inside the housing to outside the housing through a port,
5. Where an article retrieval device provides the articles to the transfer means from a storage location inside the housing.
6. Where that port can restrict access to the packages which remain inside the enclosure. (I think this is redundant)
8. where the in and out port are the same, or
9. where the in and out port are different.

In accordance with another embodiment, the present invention includes:
1. an enclosure
2. a port which enables transfer of packages into the enclosure
3. a port which enables transfer of packages out of the enclosure, and
4. Further including a conveyance system for transferring the packages from the portal into the enclosure, the conveyance system including:
   a. Means for identification of the package+/or articles inside the package
   b. Apparatus for analysis of the orientation of the package
   c. Apparatus for manipulation of the package based on the orientation analysis
   d. Apparatus for determination if the package is acceptable to enter the enclosure
      i. where the Determination is based on bar code/input scan of the package,
      ii. where the Determination is based on what the housing was expecting via advance knowledge, such as via a wireless connection In another embodiment, the invention comprises:
1. enclosure for storing packages therein, having a loading and user access port
2. a conveyor for transporting packages into the enclosure,
3. A system for removing a portion of a package after being transported into the enclosure, the portion being removed creating an opening in the package from which individual articles may be removed, and
4. An article retrieving device located in the enclosure for removing articles from the package via the opening and transferring the articles to a further location.
   a. Where the further location is a storage location in the enclosure
   b. Where the further location is the user access port.

Business methods in accordance with the invention include using the above-noted enclosure and apparatus to make an automated package/article storage and retrieval system which can use the shipping facilities of "common carriers" to "load" the enclosure with the packages and articles to dispensed to the end users.

This method allows multiple manufactures, each making a different article, so ship their items in bulk to a given enclosure, which enclosure can then "load itself" without human intervention, thereby resulting in significant cost savings in shipping, as well as reduced personnel costs at the enclosure. by opening/unsealing flaps of said container, and then physically separating said flaps from said container or securing said flaps to exterior sides of said container in a manner so as to form said opening in said container.

The Fully automated system can be sealed and no human intervention to operate to allow containers having some of which shipping containers having different external dimensions than others of the shipping containers in, an opening means, and whereby the opening means can adjust/be adaptable to opening shipping containers having various outer dimensions, and having means for adjusting the opening of the shipping container, and using the attribute information for determining unless a proper an authorization code is received by the system it will prevent a container(s) from proceeding to the container opening means.

The following are some of the situations which the system can operate as to:
- Where the plurality of packages within a given box are of the same type (identical items)
- Where the packages within a given box are of a variety or mixed product types (bags of different flavors, size, type of product)
- Where the retrieval device goes into the box to retrieve the packages
- Where the plurality of packages are (pre-packed) positioned within the box such that the (possibly without divider walls, possibly random, organized in a pattern such as being organized into rows, columns, stack and or layer.)
- Where packages are made from flexible packaging materials, such as a bag or pouch (as opposed to rigid packages, such as bottles, boxes, cans, rigid or semi-rigid containers [such as yogurt or cottage cheese container type])
  - Where the flexible packages are easily deformable and tend to shift within the box and therefore for the retrieval device to determine the position to pick the product from can be challenging due to the unpredictability of the package location within the box.
- Where the packages are positioned in the box in a manner that is at least somewhat disorganized and or stored in a random manner.
- The retrieval apparatus itself, (or the conveyance systems, or handling) can also cause the packages to become disorganized or less organized than they were originally when they were originally packed (Originally packed means for example how they were packed into the box at the point when the box was shipped from a different distribution point, such as at the factory where the products were produced or at a remote warehouse where they were packed into the carton.

The system can automatically opening a shipping carton, and Using the shipping carton as the storage container from which orders can be automatically picked and deal with the Tremendous variety and variability of different shipping carton types, shapes and sizes, different package types (bags, boxes, bottles), shapes and sizes, and the tremendous variety of physical orientation of packages within the shipping cartons, different temperature zones these cartons must be stored in. In some prior systems, there is a requirement for a person to manually open up the shipping carton and transfer the packages to a dispensing bin. Regardless of the type of product being transferred and regardless as to how the packing arrangement was in the shipping container, the packages then had to be arranged in a specific manner required for the dispensing mechanism to operate properly. So, packages of different types having different sizes and shapes which were originally packed into their ORIGINAL SHIPPING CARTONS, each different item type having been arranged in a variety of ways and which Packages are organized in an organized manner which is the same from item type to item type. This loading pattern (including random pattern or no pattern) is dictated by the dispensing or retrieval mechanism.

Shipping container is able to be used as the storage container from which articles are retrieved The system combines Intelligent box opening combined with intelligent box manipulation/positional storing which enables the article retrieval device to have the ability to pre-determine how and where the retrieval device needs to be manipulated in order to retrieve the articles.

The system can include a Package ID system for Authorizing Package Input and Moving the loaded box/bag to the customer retrieval area, or seating the box, or labeling box with shipping information for destination, or storing box in a queue area within or associated with the housing/system, and or an authorized person can present ID to the machine and then can be authorized by the control system to remove the container The delivery to the system:
Can be a truck with a driver, or can be multiple delivery agents, or can include a plurality of unrelated trucking or transportation entities each with their own identification codes Can be offloaded from a truck by hand, By automatic conveyor system, by pallet, with a forklift.

The Shipping container can be identified as a specific type of container, or as having a Specific type of article contained therein, or as having identification including bar code markings, graphics, text, symbols, or an RFID tag.

The shipping container may have been closed or sealed using tape, using glue, using staples. The shipping container can be a box, made of paperboard, cardboard, plastic, corrugated material or some other material. The shipping container can be a formed bag, which can have different sizes and or shapes and can be made from various materials including plastic, or including paper.

The shipping container can have a plurality of articles therein, where the at least one article can be a package, and where the package can have at least one article contained therein.

The packages which are stored in the shipping container can be stored in an organized manner such as in rows, columns, layers, whereby some of the packages are occluded by other packages and where a plurality of packages within a specific container are stored with the front facings of the plurality of packages facing in various directions or wherein packages are stored in a manner such that they could shift their position during transport or further wherein where the articles are stored in the shipping container in a random manner.

The Types of articles can be various and can include items such as food, electronics, components, paper goods The Types of packages can be various as well and can include bottles, cans, bags, cylinders, pouches The articles within the shipping container can be identified, as a specific type of article or as being a specific type of package, or as a package having a specific type of article contained therein The package can have an identification including bar code markings, graphics, text, symbols, or RFID tag which the various types of sensors and or cameras can detect to identify the packages and their orientation or position within the opened shipping container The Housing can be one that houses the components and systems of the described automated store, and provides a secure environment for the containers and apparatus of related to the system and can be a stand-alone building, or can be a portable trailer, or can be above ground or underground, or be as small or large, or can be housed in a cabinet the size of a room or a large building, can be made of wood, metal, masonry, plastic or other construction materials.

The Input port opening can be an opening in the housing for allowing packages to enter into the housing which opening is large enough to allow packages of various sizes and shapes to enter into the housing Computer Control System and can be PC, embedded controls, mechanical and or electromechanical relays, at least partially remote, and can have hardware which can be located fully within or proximate to the housing, or Which can be at least partially remote, and or which can communicate with computer systems at remote locations, and which can be linked to a network or communications link, and which can operate a video interface for communicating with users of the system, and which can operate a video and or audio communications link to enable people at the store to communicate with people or computers at a remote site.

The system has software which has a database which can be local or remote the store, and has ability to monitor inventory levels, and has ability to control all of the apparatus within the system and or housing which can send information over the internet to users, customers, suppliers, maintenance personell, owners, investors, lenders in the store, and other interested parties and Can be operable to shut down part or all of the systems operations in the event of a malfunction.

The Delivery Person Interface enables authorization for proceeding with delivery and has the ability to identify (and or validate identity) the Delivery person/entity and the ability to confirm that the specific delivery was anticipated and pre-authorized based on the order database of control system. Also it can have the ability to communicate via email, video conference, video phone, wireless voice etc. and in real time to a remote location and or to a remotely located person and or computer for example, for the purpose of dealing with any issues relating to the delivery A badge, bill of laiding, pin code, biometrics, other code etc. may be used to activate the authorization.

Shipping container identification/ID device can determines what the shipping container is, its contents, its identity and can determine the shipping container contents, type, packed quantity, article size, The system may be designed to manipulate the shipping container in order to better sense the shipping container's attributes by utilizing a gripper mechanism, or by using a robot, or by using a device that can rotate the shipping container. It can utilize a camera with image or pattern recognition software, or a Barcode Recognition system, or an RFTD system, or a Text reading system, or An optical scanner, or other type of sensor, or a mechanical or electromechanical switch, or light beam, or a color recognition sensor, and by determining attributes of the shipping containers and comparing that information with information that is stored on a database, either a local or remote one it can Feed the ID information to Control system database to determine whether shipping container should be allowed to pass into the system.

The secure portal can be a secure input is restricted to allow only authorized entry into the housing In order to gain entry into the housing, a shipping container must move through a first opening, and where entry through the opening is typically prevented by an exterior door (barrier, gate, fencing, bars or other physical security mechanism) which may be located near, adjacent to or indirectly connected to the exterior of the housing and Whereby the authorized opening of the exterior door is enabled by an authorization code Whereby the authorized opening of the exterior door is enabled by utilizing a physical lock and key or other similar type of device etc. and Once a package passes through the external opening, the package is situated in an interlocking security holding area. This can utilize two doors that open and close in conjunction with one another so as to prevent unauthorized access into the system by a shipping container or person. Further passage beyond the security holding area is typically blocked by an internal door. The internal door will not open until and unless the exterior door has been closed. This arrangement of at least two doors together with a security holding area is intended to prevent unauthorized entrance of a person, shipping container or other object. Additionally, the system can utilize cameras, motion sensors, infrared sensor and or specialized detection software and or other similar devices for determining that no person is within the security area before the system will enable the interior security door to be opened. Additionally, the system can have cameras monitoring the security area of the system so that a person or computer at a remote site can monitor the activity in the loading area or security area of the system.

The system has a security area for preventing unauthorized objects or people from gaining entrance into the system. The portal into the system has a security area beyond the portal opening where one or a plurality of shipping containers can be located after the shipping containers are placed onto the conveyance means delivery person, whereby the system can close the external security door . . . so that a person cannot gain entrance into the system during package loading.

Shipping containers are loaded onto a conveyance system for moving package into the housing shipping containers can be loaded into the system, and or onto a conveyor system, directly into a security holding area, and by placing a container on a surface within the housing, or by a transport device located in the housing which picks up a container and moves transports it for example, by a robot, by a gantry, by a crane or other means. And it can move them by loading one shipping container at a time, or by loading a plurality of containers at a time, or by placing a pallet of shipping containers at the opening to the housing. And the system may be equipped with means for moving shipping containers from a pallet to a point within the housing and towards a container opening means. The system can also be used in conjunction with a de-palletizer.

Container opening device with an automated forming means for using the determined position specific to each of the closed shipping containers to form an opening in each of the plurality of the shipping containers, which formed opening may include cutting the container material, cutting the tape, opening the flaps, and or cutting off the flaps. The opening is positioned and dimensioned in a manner that is specific to the identified typed of each of the plurality of shipping containers for allowing automated retrieval of articles from inside of the opened shipping containers, ie. where they are stored in rows, columns, removing from front, top side etc., so for example it can be leaving a certain amount of lip not cut off so as to act as a retainer or cut the box in some other place or manner.

The system can use a disposing device for material removed from me to make opening for recycling it.

The article retrieving device for removing the articles from the container

Article retrieving device retrieving articles via opening An Retrieval Apparatus for Retrieving articles from the opened boxes for order picking, using robots, vision systems, Retrieval apparatus using vision systems and pattern recognition to guide the retrieval apparatus in picking, Retrieval apparatus which use vacuum sensing for determining when they have secured to a package, Robots, gantries, grippers, different sizes and shapes of suction cups, electro-mechanical grippers.

The system can Cooperate with user selection system, for retrieving selected articles and with the Packaging system inside the system which can cooperate with user selection system, for generating a User Package of user selected articles.

One of the advantages of the system is that various delivery personell, such as a plurality parcel services, trucking companies etc. that do not have to have any particular relationship of trust with the facility can "load" the system . . . in other words, the concept where an automated system such as a vending system or automated retail, which traditionally requires a trusted agent or employee to go and gain access to prior systems in order to load new articles into the system and where these employees are dedicated specifically to loading the automated machines, and their trucks and warehouses and logistical systems are all specifically dedicated to dealing with and loading the prior machines, and since these people, trucks and equipment are all dedicated only to managing the equipment of a and a key requirement of the specific retail or vending operator having dedicated resources, for example, people and trucks to service and load the systems is that the operator must have employees whom he can have significant trust in and a formal business relationship with since, he needs to rely upon the dedicated loading person to load carefully and properly, load items in the correct place be honest and not to steal from the system when the loading person to the operator or owner of the automated retail or vending system, it is not possible to fully benefit from the economies of scale that would occur if the system was rather able to be loaded automatically and leverage the existing efficient general transportation industry. By having the box opening and loading into the system being fully automated, the owner or operator of the system does not need to have a trusted person "load" the machine since the only requirement is to have the boxes be delivered to the system and placed on the conveyor system. One of the many great advantages to this system is therefore to enable an operator or owner to utilize common carriers or general and non-dedicated transportation companies to deliver the boxes since there is no longer a need to have a trusted person open boxes, or load articles into the system.

Most prior systems in automated stores and or automated vending systems utilize dispensing devices or retrieval apparatus that are designed to dispense or retrieve articles from highly organized rows or columns which are specific in nature to the given system and which are intended to be loaded in a particular way so as to enable the particular dispensing or retrieval mechanism to properly dispense or retrieve the articles. Due to this requirement of prior systems, a person must manually remove the articles from their original shipping containers and manually load them into the bins, compartments or other storage systems of the particular vending or automated store system.

Therefore, except for situations where articles which are packed into special shipping container which are specifically designed to fit into a specific type of retrieval or dispensing system, most shipping containers are not suitable to be simply put into an automatic apparatus and retrieved from a typical vending or automated store system.

The invention claimed is:

1. A secure automated retail store for storing, selling and distributing articles, the secure automated retail store having a housing which is operated by computer control so that no people are required to be inside of the housing for either of receiving closed shipping containers into the housing for storage, or for selling and distributing articles to a customer at an output of the housing, which articles were retrieved from inside of stored ones of the shipping containers, comprising:

a secure entry means controlled by a computer for receiving a plurality of closed shipping containers at an entry point thereof,
   said secure entry means being controlled by said computer so that automatically and without human manipulation only closed shipping containers which are authorized for entry into the housing, are passed from said entry point into the housing,
   said secure entry means including a physical barrier controlled by said computer so as to automatically prevent unauthorized people from entering into a storage area of the housing where said shipping containers are stored, and
   where at least some of the plurality of closed shipping containers which are entered into the housing have outer dimensions which are different from the outer dimensions of other ones of the plurality of closed shipping containers which are entered into the housing;
an automated forming means for automatically and without human manipulation forming an opening in a plurality of the shipping containers which have been entered into the housing;
an automated storing means for automatically and without human manipulation storing the plurality of opened shipping containers inside a storage area of the housing;
a customer interface for allowing a customer of said automated retail store to select a desired one or more of the articles stored therein, and to make a payment for said selected one or more articles;
a computer controlled retrieving means for automatically and without human manipulation entering into selected ones of the opened shipping containers located in the storage area, which said retrieving means passes through the formed opening in selected ones of the shipping containers so as to retrieve said customer selected articles from inside selected ones of the stored opened shipping containers;
a secure output means controlled by a computer so that automatically and without human manipulation only retrieved articles are passed from inside said storage area to an output of the housing, said secure output means including a physical barrier controlled by said computer so as to automatically prevent unauthorized people from entering from said output of the housing into said storage area of the housing where said shipping containers are stored; and
a computer controlled moving means for automatically and without human manipulation moving the retrieved articles to said output of the housing.

2. The automated retail store of claim 1, where the entry means includes authorizing means for authorizing the entry into the automated retail store of only said authorized shipping containers.

3. The automated retail store of claim 2, where the authorizing means includes a shipping container identification (ID) device for determining the identity of a type for the shipping containers.

4. The automated retail store of claim 3, where the shipping container ID device can access a database in order to determine one or more of what articles are contained in the shipping containers and how those articles are arranged in the shipping containers, based on their determined identity.

5. The automated retail store of claim 4, where the shipping container ID device cooperates with a manipulation device for manipulating the shipping containers in order enhance the ability of the shipping container ID device to determine the identity of the shipping containers.

6. The automated retail store of claim 5, where the manipulation device includes one or more of a multi-axis gripper mechanism, a multi-axis robot, or a multi-axis device that can rotate the shipping container.

7. The automated retail store of claim 3, where the shipping container ID device includes a camera imaging system, which camera imaging system uses image or pattern recognition techniques to identify the shipping containers.

8. The automated retail store of claim 7, where the camera imaging system includes a color image sensor for sensing attributes of the shipping containers, which attributes are then compared with information that is stored on a database, at either a local or remote location, so as to identify the shipping containers.

9. The automated retail store of claim 2, where said secure entry means and said secure output means each include an interlock area having an exterior door for preventing entry into the interlock area from locations exterior of the housing.

10. The automated retail store of claim 9, where opening of said exterior door of said entry means is enabled when the authorizing means has authorized the entry into the automated retail store.

11. The automated retail store of claim 9, where said interlock area is an area bounded by said exterior door and an internal door, where passage of authorized containers past the internal door can only occur after said exterior door has been closed and a sensor has determined that only authorized persons or shipping containers are in the interlock area.

12. The automated retail store of claim 1, where said forming means operates so as to form said opening in said shipping containers at a location and with a dimension that is specific to the identified type of each of the plurality of shipping containers, so as to thereby ensure that said computer controlled retrieving means can enter the opened shipping container via the formed opening.

13. The automated retail store of claim 1, where said forming means forms said opening by one or more of the following techniques:
  i. removing from said shipping container one or more sides thereof,
  ii. removing a portion of the outside surface of said shipping container,
  iii. by opening./unsealing flaps of said container, and then physically separating said flaps from said container or securing said flaps to exterior sides of said container in a manner so as to form said opening in said container.

\* \* \* \* \*